United States Patent
Kim et al.

(10) Patent No.: US 10,175,534 B2
(45) Date of Patent: Jan. 8, 2019

(54) COMPENSATION FILM AND OPTICAL FILM AND DISPLAY DEVICE

(71) Applicant: SAMSUNG ELECTRONICS CO., LTD., Suwon-si (KR)

(72) Inventors: Hyung Jun Kim, Suwon-si (KR); Sang ah Gam, Seoul (KR); Myung Sup Jung, Seongnam-si (KR); Hyun-Seok Choi, Anyang-si (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 729 days.

(21) Appl. No.: 14/248,052

(22) Filed: Apr. 8, 2014

(65) Prior Publication Data

US 2015/0131032 A1    May 14, 2015

(30) Foreign Application Priority Data

Nov. 12, 2013  (KR) .......................... 10-2013-0137146

(51) Int. Cl.
*G02F 1/13363* (2006.01)
*G02B 5/30* (2006.01)
*C09K 19/02* (2006.01)

(52) U.S. Cl.
CPC ....... *G02F 1/13363* (2013.01); *G02B 5/3016* (2013.01); *G02B 5/3083* (2013.01);
(Continued)

(58) Field of Classification Search
CPC . G02B 5/3016; G02B 5/3083; G02F 1/13363; G02F 2001/133633;
(Continued)

(56) References Cited

U.S. PATENT DOCUMENTS 7,719,644 B2  5/2010 Fukagawa et al.
7,732,024 B2  6/2010 Mazaki et al.
(Continued)

FOREIGN PATENT DOCUMENTS

JP  2002040258 A  * 2/2002  ............... G02B 5/30
JP  2004-226758     8/2004
(Continued)

*Primary Examiner* — Eli D. Strah
(74) *Attorney, Agent, or Firm* — Cantor Colburn LLP

(57) ABSTRACT

A compensation film includes a first retardation layer including a polymer having negative birefringence, and a second retardation layer including a liquid crystal having positive birefringence, where the first retardation layer has an in-plane retardation ($R_{e1}$) of 320 nm to 1050 nm for incident light having wavelength of 550 nm, the second retardation layer has an in-plane retardation ($R_{e2}$) of 180 nm to 910 nm for the incident light, an entire in-plane retardation ($R_{e0}$) of the first and second retardation layers for the incident light is a difference between the in-plane retardations of the first and second retardation layers, an angle between slow axes of the first and second retardation layers is 85 to 95 degrees, and the entire in-plane retardation ($R_{e0}$) of the first and second retardation layers for the wavelength of 450 nm, 550 nm and 650 nm satisfies $R_{e0}$ (450 nm)<$R_{e0}$ (550 nm)<$R_{e0}$ (650 nm).

13 Claims, 6 Drawing Sheets

(52) U.S. Cl.
CPC ... *B32B 2457/202* (2013.01); *B32B 2457/206* (2013.01); *C09K 19/02* (2013.01); *G02F 1/133634* (2013.01); *G02F 2001/133633* (2013.01); *G02F 2001/133637* (2013.01); *G02F 2202/40* (2013.01); *Y10T 428/105* (2015.01); *Y10T 428/1036* (2015.01)

(58) Field of Classification Search
CPC ..... G02F 2202/40; G02F 2001/133637; G02F 1/133634; B32B 2457/202; B32B 2457/206; Y10T 428/1005; Y10T 428/1036; Y10T 428/105; C09K 19/02
See application file for complete search history.

(56) References Cited

U.S. PATENT DOCUMENTS

| | | | |
|---|---|---|---|
| 7,807,235 B2 | 10/2010 | Kim et al. | |
| 8,137,766 B2 | 3/2012 | Mazaki et al. | |
| 2005/0110933 A1* | 5/2005 | Jeon | G02F 1/133634 349/141 |
| 2006/0182900 A1 | 8/2006 | Kim et al. | |
| 2007/0263152 A1 | 11/2007 | Mazaki et al. | |
| 2008/0200621 A1* | 8/2008 | Ohmori | C08F 216/38 525/472 |
| 2009/0033835 A1 | 2/2009 | Fukagawa et al. | |
| 2009/0096970 A1* | 4/2009 | Sakai | G02B 5/3016 349/117 |
| 2010/0165265 A1* | 7/2010 | Moon | G02F 1/133634 349/96 |
| 2010/0171916 A1 | 7/2010 | Mazaki et al. | |
| 2010/0271573 A1* | 10/2010 | Sakai | G02F 1/13363 349/96 |
| 2015/0205012 A1* | 7/2015 | Noguchi | C08F 212/08 526/272 |

FOREIGN PATENT DOCUMENTS

| | | | |
|---|---|---|---|
| JP | 2004325971 A * | 11/2004 | ............ G02B 5/30 |
| JP | 2006-268033 | 10/2006 | |
| JP | 2007-017637 | 1/2007 | |
| JP | 2009-288440 | 12/2009 | |
| JP | 2009-294521 | 12/2009 | |
| KR | 10-2006-0092048 | 8/2006 | |

* cited by examiner

COMPENSATION FILM AND OPTICAL FILM AND DISPLAY DEVICE

This application claims priority to Korean Patent Application No. 10-2013-0137146 filed on Nov. 12, 2013, and all the benefits accruing therefrom under 35 U.S.C. § 119, the contents of which are incorporated by reference herein in its entirety.

BACKGROUND

1. Field

Embodiments of the invention relate to a compensation film, an optical film, and a display device including the compensation film or the optical film.

2. Description of the Related Art

A flat panel displays may be classified into a light-emitting display device that emits light by itself and a non-emissive display device that includes a separate light source, and a compensation film such as a retardation film is generally employed for improving the image quality thereof.

In the case of the light emitting display device, for example, an organic light emitting diode ("OLED") display, the visibility and the contrast ratio may be deteriorated by reflection of the exterior light caused by a metal such as an electrode. To reduce the deterioration in the visibility and the contrast ratio, the linear polarized light is shifted into circularly polarized light by using a polarizer and a compensation film, so that reflection of the external light by the OLED display and leakage thereof to the outside may be effectively prevented.

To reduce the reflection of the exterior light, a liquid crystal display ("LCD"), which is a non-emissive display device, changes the linear polarized light into the circularly polarized light to improve the image quality according to the type of the device such a transparent type, a transflective type, or a reflective type, for example.

However, a conventional compensation film is strongly dependent upon the wavelength to the incident light, so such a compensation film may effectively operate for light having a certain wavelength, but the effect thereof may be deteriorated for other wavelengths. In addition, a conventional compensation film may have strong viewing angle dependency.

SUMMARY

One embodiment provides a compensation film with improved display characteristics by reducing the wavelength dependency and the viewing angle dependency.

Another embodiment provides an optical film including the compensation film.

A further embodiment provides a display device including the compensation film.

According to an embodiment, a compensation film includes a first retardation layer including a polymer having negative birefringence, and a second retardation layer including a liquid crystal having positive birefringence, where the first retardation layer has an in-plane retardation ($R_{e1}$) in a range of about 320 nanometers (nm) to about 1050 nm for incident light having a wavelength of about 550 nm, the second retardation layer has an in-plane retardation ($R_{e2}$) in a range of about 180 nm to about 910 nm for the incident light having the wavelength of about 550 nm, the entire in-plane retardation ($R_{e0}$) of the first retardation layer and the second retardation layer for the incident light having the wavelength of about 550 nm is determined by a difference between the in-plane retardation ($R_{e1}$) of the first retardation layer and the in-plane retardation ($R_{e2}$) of the second retardation layer, an angle between a slow axis of the first retardation layer and a slow axis of the second retardation layer is about 85 to about 95 degrees, and the entire in-plane retardation ($R_{e0}$) of the first retardation layer and the second retardation layer for wavelengths of about 450 nm, 550 nm, and 650 nm satisfy $R_{e0}$ (450 nm)<$R_{e0}$ (550 nm)<$R_{e0}$ (650 nm).

In an embodiment, the entire in-plane retardation ($R_{e0}$) of the first retardation layer and the second retardation layer for the incident light having the wavelength of about 550 nm may be in a range of about 120 nm to about 160 nm.

In an embodiment, the first retardation layer may have a short wavelength dispersion in a range of about 1.00 to about 1.15, and the second retardation layer may have a short wavelength dispersion in a range of about 1.05 to about 1.30.

In an embodiment, the first retardation layer may have a long wavelength dispersion in a range of about 0.90 to about 1.00, and the second retardation layer may have a long wavelength dispersion in a range of about 0.80 to about 0.99.

In an embodiment, the compensation film may have a short wavelength dispersion greater than or equal to about 0.7 and less than about 1.0, and the compensation film may have a long wavelength dispersion greater than about 1.0 and less than or equal to about 1.2.

In an embodiment, a thickness direction retardation ($R_{th1}$) and the in-plane retardation ($R_{e1}$) of the first retardation layer for the incident light having the wavelength of about 550 nm may satisfy the following inequation: $-2.0 \leq (R_{th1}/R_{e1})+0.5 \leq 0.5$, and a thickness direction retardation ($R_{th2}$) and the in-plane retardation ($R_{e2}$) of the second retardation layer for the incident light having the wavelength of about 550 nm may satisfy the following inequation: $1.0 \leq (R_{th2}/R_{e2})+0.5 \leq 1.5$.

In an embodiment, a thickness direction retardation ($R_{th0}$) and the in-plane retardation ($R_{e0}$) of the compensation film for the incident light having the wavelength of about 550 nm may satisfy the following inequation: $-1.0 \leq (R_{th0}/R_{e0})+0.5 \leq 1.0$.

In an embodiment, the first retardation layer may be an elongated polymer layer, and the first retardation layer may have a refractive index simultaneously satisfying the following inequations: $n_{x1} \geq n_{y1}$; and $n_{x1} \geq n_{z1}$, where $n_{x1}$ denotes a refractive index at a slow axis of the first retardation layer, $n_{y1}$ denotes a refractive index at a fast axis of the first retardation layer, and $n_{z1}$ denotes a refractive index in a direction perpendicular to the slow and fast axes of the first retardation layer.

In an embodiment, the second retardation layer may be an anisotropic liquid crystal layer, and the second retardation layer may have a refractive index simultaneously satisfying the following inequations: $n_{x2} \geq n_{y2}$, and $n_{x2} \geq n_{z2}$, where $n_{x2}$ denotes a refractive index at a slow axis of the second retardation layer, $n_{y2}$ denotes a refractive index at a fast axis of the second retardation layer, and $n_{z2}$ denotes a refractive index in a direction perpendicular to the slow and fast axes of the second retardation layer.

In an embodiment, the compensation film may have a refractive index satisfying the following inequation: $n_{x0} > n_{z0} > n_{y0}$, where $n_{x0}$ denotes a refractive index at a slow axis of the compensation film, $n_{y0}$ denotes a refractive index at a fast axis of the compensation film, and $n_{z0}$ denotes a refractive index in a direction perpendicular to the slow and fast axes of the compensation film.

In an embodiment, the polymer may include polystyrene, poly(styrene-co-maleic anhydride), polymaleimide, poly (meth)acrylic acid, polyacrylonitrile, polymethyl(meth)acrylate, cellulose ester, poly(styrene-co-acrylonitrile), poly(styrene-co-maleimide), poly(styrene-co-methacrylic acid), a derivative thereof, a copolymer thereof, or a mixture thereof.

In an embodiment, the liquid crystal may be a reactive mesogen liquid crystal.

In an embodiment, the reactive mesogen liquid crystal may include at least one of a rod-shaped aromatic derivative having at least one reactive cross-linking group, propylene glycol 1-methyl, propylene glycol 2-acetate, and a compound represented by P1-A1-(Z1-A2)n-P2, where P1 and P2 independently include acrylate, methacrylate, vinyl, vinyloxy, epoxy or a combination thereof, A1 and A2 include independently 1,4-phenylene, naphthalene-2,6-diyl group, or a combination thereof, Z1 includes a single bond, —COO—, —OCO— or a combination thereof, and n is 0, 1 or 2.

According to another embodiment, an optical film including a polarizer element and the compensation film is provided.

According to yet another embodiment, a display device includes a display panel, a compensation film disposed on the display panel, and a polarizer element disposed on the compensation film is provided, where the compensation film includes a first retardation layer including a polymer having negative birefringence, and a second retardation layer including liquid crystal having positive birefringence, the first retardation layer has an in-plane retardation ($R_{e1}$) in a range of about 320 nm to about 1050 nm for incident light having a wavelength of about 550 nm, the second retardation layer has an in-plane retardation ($R_{e2}$) in a range of about 180 nm to about 910 nm for the incident light having the wavelength of about 550 nm, an entire in-plane retardation ($R_{e0}$) of the first retardation layer and the second retardation layer for the incident light having the wavelength of about 550 nm is a difference between the in-plane retardation ($R_{e1}$) of the first retardation layer and the in-plane retardation ($R_{e2}$) of the second retardation layer, the entire in-plane retardation ($R_{e0}$) of the first retardation layer and the second retardation layer for wavelengths of about 450 nm, 550 nm, and 650 nm satisfies the following inequation: $R_{e0}$ (450 nm)<$R_{e0}$ (550 nm)<$R_{e0}$ (650 nm), and an angle between a slow axis of the first retardation layer and a slow axis of the second retardation layer is in a range of about 85 degrees to about 95 degrees.

In an embodiment, the first retardation layer may have a short wavelength dispersion in a range of about 1.00 to about 1.15, the second retardation layer may have a short wavelength dispersion in a range of about 1.05 to about 1.30, the first retardation layer may have a long wavelength dispersion in a range of about 0.90 to about 1.00, the second retardation layer may have a long wavelength dispersion in a range of about 0.80 to about 0.99, the entire short wavelength dispersion of the first retardation layer and the second retardation layer may be greater than or equal to about 0.7 and less than about 1.0, and the entire long wavelength dispersion of the first retardation layer and the second retardation layer may be greater than about 1.0 and less than or equal to about 1.2.

In an embodiment, a thickness direction retardation ($R_{th1}$) and the in-plane retardation ($R_{e1}$) of the first retardation layer for the incident light having the wavelength of about 550 nm may satisfy the following Inequation: $-2.0 \leq (R_{th1}/R_{e1})+0.5 \leq 0.5$, a thickness direction retardation ($R_{th2}$) and the in-plane retardation ($R_{e2}$) of the second retardation layer for the incident light having the wavelength of about 550 nm may satisfy the following Inequation: $1.0 \geq (R_{th2}/R_{e2})+0.5 \geq 1.5$, and the entire thickness direction retardation ($R_{th0}$) and the entire in-plane retardation ($R_{e0}$) of the first retardation layer and the second retardation layer for the incident light having the wavelength of about 550 nm may satisfy the following inequation: $-1.0 \leq (R_{th0}/R_{e0})+0.5 \leq 1.0$.

In an embodiment, the first retardation layer may be an elongated polymer layer including polystyrene, poly(styrene-co-maleic anhydride), polymaleimide, poly(meth)acrylic acid, polyacrylonitrile, polymethyl(meth)acrylate, cellulose ester, poly(styrene-co-acrylonitrile), poly(styrene-co-maleimide), poly(styrene-co-methacrylic acid), a derivative thereof, a copolymer thereof, or a mixture thereof, and the second retardation layer may be an anisotropic liquid crystal layer including a reactive mesogen liquid crystal.

In an embodiment, the display panel may be a liquid crystal panel or an organic light emitting panel.

BRIEF DESCRIPTION OF THE DRAWINGS

The above and other features of the invention will become more apparent by describing in detailed exemplary embodiments thereof with reference to the accompanying drawings, in which.

DETAILED DESCRIPTION

Figure 1:
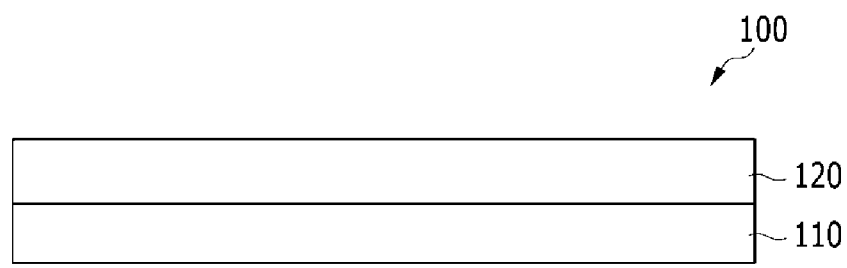
FIG. 1 is a cross-sectional view schematically showing an embodiment of a compensation film, according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, an embodiment of a compensation film according to the invention will be described referring to FIG. 1.

FIG. 1 is a cross-sectional view schematically showing an embodiment of a compensation film, according to the invention.

Referring to FIG. 1, an embodiment of the compensation film 100 includes a first retardation layer 110 and a second retardation layer 120.

The first retardation layer 110 is an elongated polymer layer including a polymer having negative birefringence, and the second retardation layer 120 is an anisotropic liquid crystal layer including a liquid crystal having positive birefringence. The birefringence ($\Delta n$) is a difference found by subtracting the refractive index ($n_o$) of light propagating perpendicular to an optical axis from the refractive index ($n_e$) of light propagating parallel to the optical axis, and the first retardation layer 110 and the second retardation layer 120 have opposite-sign birefringences from each other, e.g., positive birefringence and negative birefringence, respectively, or vice versa.

The polymer having a negative birefringence may include, for example, polystyrene, poly(styrene-co-maleic anhydride), polymaleimide, poly(meth)acrylic acid, polyacrylonitrile, polymethyl(meth)acrylate, cellulose ester, poly(styrene-co-acrylonitrile), poly(styrene-co-maleimide), poly(styrene-co-methacrylic acid), or a combination thereof (e.g., a derivative thereof, a copolymer thereof, or a mixture thereof), but is not limited thereto.

The first retardation layer 110 may maintain the negative birefringence after being elongated.

The liquid crystal may be a monomer, an oligomer, or a polymer having a rigid-rod shape. The liquid crystal may be aligned in a predetermined direction along the optical axis.

The liquid crystal may be a reactive mesogen liquid crystal and may have, for example, a reactive cross-linking group. The reactive mesogen liquid crystal may include, for example, a rod-shaped aromatic derivative having at least one reactive cross-linking group, propylene glycol 1-methyl, propylene glycol 2-acetate, and a compound represented by P1-A1-(Z1-A2)n-P2, or a combination thereof, but is not limited thereto. Here, P1 and P2 independently include acrylate, methacrylate, vinyl, vinyloxy, epoxy or a combination thereof, A1 and A2 independently include 1,4-phenylene, naphthalene-2,6-diyl group or a combination thereof, Z1 includes a single bond, —COO—, —OCO— or a combination thereof, and n is 0, 1 or 2.

In such an embodiment, the compensation properties may be strengthened by adjusting the optical properties of the first retardation layer 110 and the second retardation layer 120 to reduce the wavelength dependency and the viewing angle dependency of the compensation film 100 including the first retardation layer 110 and the second retardation layer 120.

In an embodiment, the first retardation layer 110 and second retardation layer 120 may have a forward wavelength dispersion retardation, and the compensation film 100 including the first retardation layer 110 and the second retardation layer 120 may have a reverse wavelength dispersion retardation. The forward wavelength dispersion retardation has higher retardation to light having a short wavelength than retardation to light having a long wavelength, and the reverse wavelength dispersion retardation has higher retardation to light having a long wavelength than retardation to light having a short wavelength.

The retardation may be referred to as in-plane retardation ($R_e$), and the in-plane retardation ($R_e$) may be represented by $R_e=(n_x-n_y)d$. Herein, $n_x$ denotes a refractive index in a direction having a highest refractive index in a plane of a film (hereinafter referred to as "slow axis"), $n_y$ denotes a refractive index in a direction having a lowest refractive index in a plane of a film (hereinafter referred to as "fast axis"), and d denotes a thickness of film.

The in-plane retardation ($R_{e1}$) of the first retardation layer 110 may be represented by $R_{e1}=(n_{x1}-n_{y1})d_1$, the in-plane retardation ($R_{e2}$) of the second retardation layer 120 may be represented by $R_{e2}=(n_{x2}-n_{y2})d_2$, and the in-plane retardation ($R_{e0}$) of the compensation film 100 may be represented by $R_{e0}=(n_{x0}-n_{y0})d_0$. Herein, $n_{x1}$ denotes a refractive index at the slow axis of the first retardation layer 110, $n_{y1}$ denotes a refractive index at the fast axis of the first retardation layer 110, $d_1$ denotes a film thickness of the first retardation layer 110, $n_{x2}$ denotes a refractive index at the slow axis of the second retardation layer 120, $n_{y2}$ denotes a refractive index at the fast axis of the second retardation layer 120, $d_2$ denotes a film thickness of the second retardation layer 120, $n_{x0}$ denotes a refractive index at the slow axis of the compensation film 100, $n_{y0}$ denotes a refractive index at the fast axis of the compensation film 100, and $d_0$ denotes a film thickness of the compensation film 100. Accordingly, the in-plane retardation ($R_{e1}$, $R_{e2}$) may be provided within a predetermined range by changing a thickness and/or a refractive index at the slow axis and/or the fast axis of the first retardation layer 110 and the second retardation layer 120.

According to an embodiment, the first retardation layer 110 may have an in-plane retardation ($R_{e1}$) in a range of about 320 nanometers (nm) to about 1050 nm for incident light having a wavelength of about 550 nm (hereinafter referred to as a "reference wavelength"), the second retardation layer 120 may have an in-plane retardation ($R_{e2}$) in a range of about 180 nm to about 910 nm for the incident light having the reference wavelength, and the entire in-plane retardation of the first retardation layer 110 and the second retardation layer 120, which is the in-plane retardation ($R_{e0}$) of the compensation film 100, for the incident light having the reference wavelength may be equal to the difference between the in-plane retardation ($R_{e1}$) of the first retardation layer 110 and the in-plane retardation ($R_{e2}$) of the second retardation layer 120. In one embodiment, for example, the compensation film 100 may have an in-plane retardation ($R_{e0}$) in a range of about 120 nm to about 160 nm for the incident light having the reference wavelength.

In the first retardation layer 110 and the second retardation layer 120, the retardation of light having a short wavelength may be higher than the retardation of light having a long wavelength, as described above. In one embodiment, for example, the in-plane retardation ($R_{e1}$) of the first retardation layer 110 for the wavelengths of 450 nm, 550 nm, and 650 nm may satisfy the following inequation: $R_{e1}$ (450 nm)≥$R_{e1}$ (550 nm)>$R_{e1}$ (650 nm) or $R_{e1}$ (450 nm)>$R_{e1}$ (550 nm)≥$R_{e1}$ (650 nm), and the in-plane retardation ($R_{e2}$) of the second retardation layer 120 may satisfy the following inequation: $R_{e2}$ (450 nm)>$R_{e2}$ (550 nm)>$R_{e2}$ (650 nm).

The changing of the retardation of the short wavelength for the reference wavelength may be referred to as short wavelength dispersion, the short wavelength dispersion of the first retardation layer 110 may be represented by $R_{e1}$ (450 nm)/$R_{e1}$ (550 nm), and the short wavelength dispersion of the second retardation layer 120 may be represented by $R_{e2}$ (450 nm)/$R_{e2}$ (550 nm). In one embodiment, for example, the first retardation layer 110 may have a short wavelength dispersion in a range of about 1.00 to about 1.15, and the second retardation layer 120 may have a short wavelength dispersion in a range of about 1.05 to about 1.30.

The changing of the retardation of the long wavelength for the reference wavelength may be referred to as long wavelength dispersion, the long wavelength dispersion of the first retardation layer 110 may be represented by $R_{e1}$ (650 nm)/$R_{e1}$ (550 nm), and the long wavelength dispersion of the second retardation layer 120 may be represented by $R_{e2}$ (650 nm)/$R_{e2}$ (550 nm). In one embodiment, for example, the first retardation layer 110 may have a long wavelength dispersion in a range of about 0.90 to about 1.00, and the second retardation layer 120 may have a long wavelength dispersion in a range of about 0.80 to about 0.99.

In an embodiment, an angle between the slow axis of the first retardation layer 110 and the slow axis of the second retardation layer 120 may be in a range of about 85 degrees to about 95 degrees.

Figure 2:
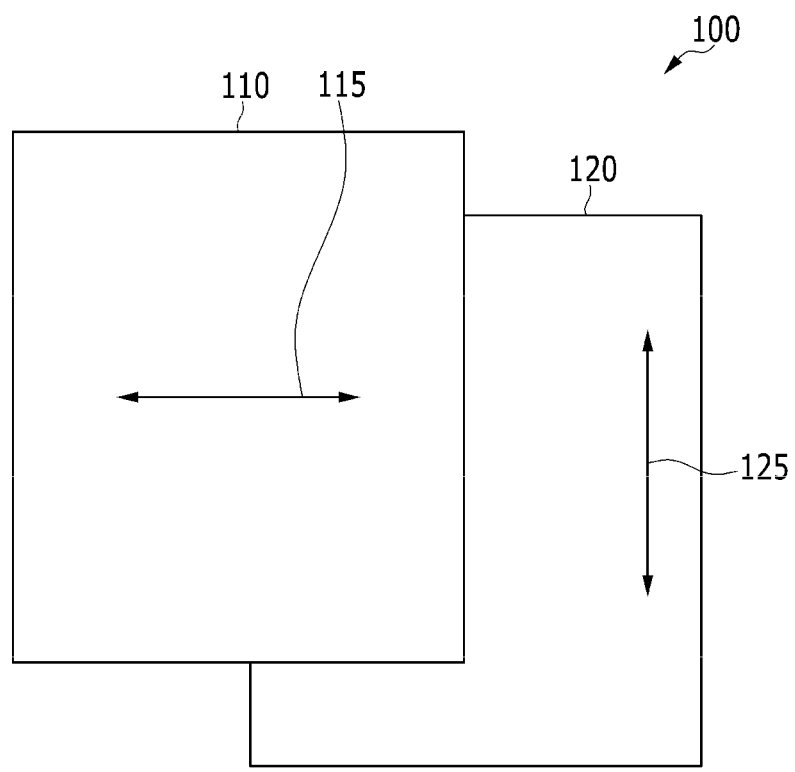
FIG. 2 is a top plan view schematically showing a slow axis of the compensation film shown in FIG. 1.

FIG. 2 is a top plan view schematically showing a slow axis of the compensation film shown in FIG. 1.

Referring to FIG. 2, the angle between the slow axis 115 of the first retardation layer 110 and the slow axis 125 of the second retardation layer 120 may be in a range of about 85 degrees to about 95 degrees, for example, about 87.5 degrees to about 92.5 degrees, or may be about 90 degrees.

When the first retardation layer 110 and the second retardation layer 120 have the in-plane retardation, and when the angle between the slow axis 115 of the first retardation layer 110 and the slow axis 125 of the second retardation layer 120 is in the range of about 85 degrees to about 95 degrees, the compensation film 100 may have a reverse wavelength dispersion retardation.

As described above, in an embodiment, the in-plane retardation ($R_{e0}$) of the compensation film 100 for the incident light having the reference wavelength may be the difference between the in-plane retardation ($R_{e1}$) of the first retardation layer 110 and the in-plane retardation ($R_{e2}$) of the second retardation layer 120, and the in-plane retardation ($R_{e0}$) of the compensation film 100 for the incident light having the reference wavelength may be in a range of, for example, about 120 nm to about 160 nm.

The in-plane retardation ($R_{e0}$) of the compensation film 100 for the wavelengths of 450 nm, 550 nm, and 650 nm may satisfy the following inequation: $R_{e0}$ (450 nm)<$R_{e0}$ (550 nm)<$R_{e0}$ (650 nm), to provide a reverse wavelength dispersion retardation.

The short wavelength dispersion of the compensation film 100 may be represented by $R_{e0}$ (450 nm)/$R_{e0}$ (550 nm), for example, greater than or equal to about 0.7 and less than about 1.0. The compensation film 100 may have a short wavelength dispersion in the range of, for example, about 0.75 to about 0.90, or may have a short wavelength dispersion of about 0.81.

The long wavelength dispersion of the compensation film 100 may be represented by $R_{e0}$ (650 nm)/$R_{e0}$ (550 nm), for example, greater than about 1.0 and less than or equal to about 1.2. The compensation film 100 may have a long wavelength dispersion in a range of, for example, about 1.15 to about 1.19, or a long wavelength dispersion of about 1.18.

In such an embodiment, the retardation includes thickness direction retardation ($R_{th}$) besides the in-plane retardation ($R_e$). The thickness direction retardation ($R_{th}$) is retardation generated in a thickness direction of a film, and the thickness direction retardation ($R_{th1}$) of the first retardation layer 110 may be represented by $R_{th1}=[\{(n_{x1}+n_{y1})/2\}-n_{z1}]d_1$, the thickness direction retardation ($R_{th2}$) of the second retardation layer 120 may be represented by $R_{th2}=[\{(n_{x2}+n_{y2})/2\}-n_{z2}]d_2$, and the thickness direction retardation ($R_{th0}$) of the compensation film 110 may be represented by $R_{th0}=[\{(n_{x0}+n_{y0})/2\}-n_{z0}]d_0$. Herein $n_{x1}$ denotes a refractive index at a slow axis of the first retardation layer 110, $n_{y1}$ denotes a refractive index at a fast axis of the first retardation layer 110, $n_{z1}$ denotes a refractive index in the direction perpendicular to the slow and fast axes of the first retardation layer 110, $n_{x2}$ denotes a refractive index at a slow axis of the second retardation layer 120, $n_{y2}$ denotes a refractive index at a fast axis of the second retardation layer 120, and $n_{z2}$ denotes a refractive index in the direction perpendicular to the slow and fast axes of the second retardation layer 120, and $n_{x0}$ denotes a refractive index at a slow axis of the compensation film 100, $n_{y0}$ denotes a refractive index at a fast axis of the compensation film 100, and $n_{z0}$ denotes a refractive index in a direction perpendicular to the slow and fast axes of the compensation film 100.

The thickness direction retardation ($R_{th0}$) of the compensation film 100 may be represented by the sum of the thickness direction retardation ($R_{th1}$) of the first retardation layer 110 and the thickness direction retardation ($R_{th2}$) of the second retardation layer 120. As the thickness direction retardation ($R_{th0}$) of the compensation film 100 is decreased, the viewing angle dependency may be reduced.

The thickness direction retardation ($R_{th1}$) and the in-plane retardation ($R_{e1}$) of the first retardation layer 110 for the incident light having the reference wavelength satisfy the following Inequation 1, and the thickness direction retardation ($R_{th2}$) and the in-plane retardation ($R_{e2}$) of the second retardation layer 120 for the incident light having the reference wavelength satisfy the following Inequation 2.

$$-2.0 \leq (R_{th1}/R_{e1})+0.5 \leq 0.5 \qquad \text{Inequation 1:}$$

$$1.0 \leq (R_{th2}/R_{e2})+0.5 \leq 1.5 \qquad \text{Inequation 2:}$$

When the first retardation layer 110 and the second retardation layer 120 satisfy Inequations 1 and 2, the compensation film 100 may satisfy the following Inequation 3 by offsetting the thickness direction retardation ($R_{th1}$) of the first retardation layer 110 and the thickness direction retardation ($R_{th2}$) of the second retardation layer 120.

$$-1.0 \leq (R_{th0}/R_{e0})+0.5 \leq 1.0 \qquad \text{Inequation 3:}$$

In addition, the first retardation layer 110 has a refractive index simultaneously satisfying the following Inequations 4 and 5, and the second retardation layer 120 has a refractive index simultaneously satisfying the following Inequations 6 and 7.

$$n_{x1} \geq n_{y1} \qquad \text{Inequation 4:}$$

$$n_{x1} \geq n_{z1} \qquad \text{Inequation 5:}$$

In Inequations 4 and 5, $n_{x1}$ denotes a refractive index at a slow axis of the first retardation layer, $n_{y1}$ denotes a refractive index at a fast axis of the first retardation layer, and $n_{z1}$ denotes a refractive index in the direction perpendicular to the slow and fast axes of the first retardation layer.

$$n_{x2} \geq n_{y2} \qquad \text{Inequation 6:}$$

$$n_{x2} \geq n_{z2} \qquad \text{Inequation 7:}$$

In Inequations 6 and 7, $n_{x2}$ denotes a refractive index at a slow axis of the second retardation layer, $n_{y2}$ denotes a refractive index at a fast axis of the second retardation layer, and $n_{z2}$ denotes a refractive index in the direction perpendicular to the slow and fast axes of the second retardation layer.

In an embodiment, where the first retardation layer 110 and the second retardation layer 120 have the refractive index satisfying the equations above, the compensation film 110 may have a refractive index satisfying the following Inequation 8.

$$n_{x0} > n_{z0} > n_{y0} \qquad \text{Inequation 8:}$$

In the Inequation 8, $n_{x0}$ denotes a refractive index at a slow axis of the compensation film, $n_{y0}$ denotes a refractive index at a fast axis of the compensation film, and $n_{z0}$ denotes a refractive index in a direction perpendicular to the slow and fast axes of the compensation film.

The compensation film 100 may effectively offset the thickness direction retardation ($R_{th0}$) and simultaneously provide λ/4 retardation in the entire visible ray region by assembling the first retardation layer 110 and the second retardation layer 120 and by controlling the optical properties to accomplish the reverse wavelength dispersion retardation. Accordingly, an embodiment of the compensation film 100 may effectively accomplish the circularly polymerized compensation function and may improve the display characteristics of the display device including the compensation film 100.

The compensation film 100 may further include an adhesion layer (not shown) between the first retardation layer 110 and the second retardation layer 120. The adhesion layer may effectively attach the first retardation layer 110 and the second retardation layer 120, and may include or be made of, for example, a pressure sensitive adhesive.

The compensation film 100 may be manufactured by preparing each of the first retardation layer 110 and the second retardation layer 120 as a film and assembling the first and second retardation layers 110 and 120, or by coating the second retardation layer 120 on the first retardation layer 110. When preparing the second retardation layer 120 as a film, a liquid crystal solution may be coated on a support layer and irradiated to be cross-linked. The support layer may be, for example, a triacetyl cellulose ("TAC") film, but is not limited thereto. The compensation film 100 may be provided or formed by, for example, roll-to-roll coating, spin coating, transferring, and the like, but is not limited thereto.

The compensation film 100 may be provided into an optical film together with a polarizer. The optical film may be, for example, an anti-reflective film.

Figure 3:
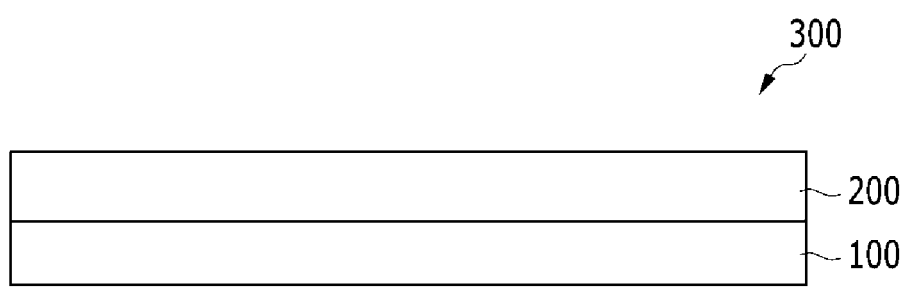
FIG. 3 is a cross-sectional view schematically showing an embodiment of an optical film, according to the invention.

FIG. 3 is a cross-sectional view schematically showing an embodiment of an optical film, according to the invention.

Referring to FIG. 3, an embodiment of the optical film 300 includes a compensation film 100 and a polarizer 200 disposed on a side (e.g., an upper surface) of the compensation film 100.

The compensation film 100 of the optical film 300 is substantially the same as an embodiment thereof as described above, and the first retardation layer 110 may be disposed to contact the polarizer 200, or the second retardation layer 120 may be disposed to contact the polarizer 200.

The polarizer 200 may be disposed on the side where the light enters, and may be a linear polarizer for shifting the polarization of incident light into linear polarization. The polarizer 200 may include or be made of, for example, elongated polyvinyl alcohol ("PVA") and the polarizer 200 may be prepared by a method including, for example, drawing a PVA film, adsorbing iodine or a dichroic dye thereto, and borating and washing the PVA film.

The optical film 300 may further include a protective layer (not shown) on a surface of the polarizer 200. The protective layer may be provided for further reinforcing the functionality or improving the durability of the optical film 300, or for reducing reflection or glare, and for example, may be a TAC film, but is not limited thereto.

The optical film 300 may further include a correction layer (not shown) disposed on the compensation film 100. The correction layer may be, for example, a color shift resistant layer, but is not limited thereto.

The optical film 300 may further include a light blocking layer (not shown) which extends along the edge. The light blocking layer may have a strip shape and may be disposed along the circumference of the optical film 300. In one embodiment, for example, the light blocking layer may be disposed between the first retardation layer 110 and the second retardation layer 120 of the compensation film 100. The light blocking layer may include an opaque material, for example, a black material. In one embodiment, for example, the light blocking layer may include or be made of a black ink.

The optical film 300 may be stacked with a compensation film 100 and a polarizer 200 according to a roll-to-roll method, but is not limited thereto.

Figure 4:
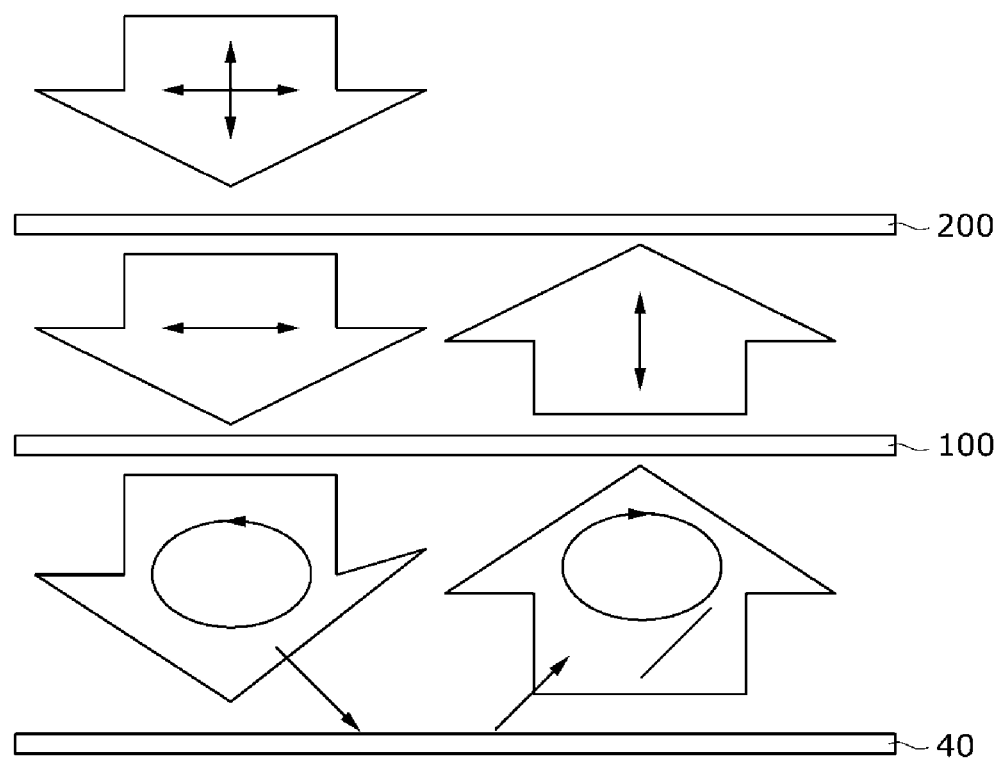
FIG. 4 is a schematic view showing the anti-reflection principle of showing an embodiment of an optical film, according to the invention.

FIG. 4 is a schematic view showing the anti-refractive principle of an embodiment of an optical film, according to the invention.

Referring to FIG. 4, while the incident unpolarized light having entered from the outside is passing through a polarizer 200, the unpolarized light is polarized. Then, the polarized light is shifted into circularly polarized light by passing through the compensation film 100, only a first polarized perpendicular component, which is a polarized perpendicular component of two polarized perpendicular components, is transmitted. While the circularly polarized light is reflected in a display panel 40 including a substrate, an electrode, and so on, the circular polarization direction of the circularly polarized light is changed, and the circularly polarized light is passed through the compensation film 100 again, such that only a second polarized perpendicular component, which is the other polarized perpendicular component of the two polarized perpendicular components, may be transmitted. As the second polarized perpendicular component is blocked by the polarizer 200, light does not exit to the outside, thereby effectively preventing the external light reflection.

The compensation film 100 and the optical film 200 may be applied to various display devices.

An embodiment of the display device includes a display panel, a compensation film disposed on a side (or a surface) of the display panel, and a polarizer element disposed on a side (or a surface) of the compensation film. The display panel may be a liquid crystal display panel or an organic light emitting display panel, but is not limited thereto.

Hereinafter, an embodiment of a display panel, where the display panel is an organic light emitting diode ("OLED") display will be described with reference to FIG. 5.

Figure 5:
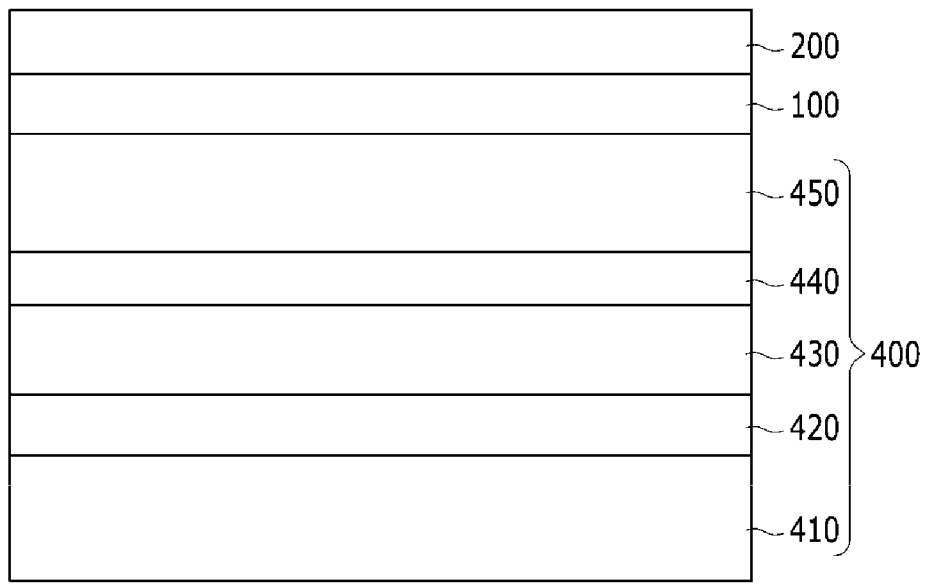
FIG. 5 is a cross-sectional view schematically showing an embodiment of an organic light emitting diode ("OLED") display, according to the invention.

FIG. 5 is a cross-sectional view showing an embodiment of an OLED display according to the invention.

Referring to FIG. 5, an embodiment of the OLED display includes an organic light emitting panel 400, a compensation film 100 disposed on a side (e.g., an upper side) of OLED panel 400, and a polarization device 200 disposed on a side (e.g., an upper side) of the compensation film 100.

The OLED panel 400 may include a base substrate 410, a lower electrode 420, an organic emission layer 430, an upper electrode 440 and an encapsulation substrate 450.

The base substrate 410 may include or be made of glass or plastic, for example.

One of the lower electrode 420 and the upper electrode 440 may be an anode, and the other of the lower electrode 420 and the upper electrode 440 may be a cathode. The anode is an electrode injected with holes, and may include or be made of a transparent conductive material having a high work function to transmit the emitted light to the outside, for example, indium tin oxide ("ITO") or indium zinc oxide ("IZO"). The cathode is an electrode injected with electrons, and may be made of a conductive material having a low work function and not affecting the organic material, and may include, for example, aluminum (Al), calcium (Ca), barium (Ba) or a combination thereof.

The organic emission layer 430 includes an organic material which may emit light when applying a voltage to the lower electrode 420 and the upper electrode 440.

An auxiliary layer (not shown) may be further provided between the lower electrode 420 and the organic emission layer 430 and between the upper electrode 440 and the organic emission layer 430. The auxiliary layer is used to balance electrons and holes, and may include a hole transport layer ("HTL"), a hole injection layer ("HIL"), an electron injection layer ("EIL"), and an electron transporting layer ("ETL").

The encapsulation substrate 450 may include or be made of glass, metal, or a polymer, and may seal the lower electrode 420, the organic emission layer 430, and the upper electrode 440 to effectively prevent moisture and/or oxygen inflow from the outside.

The compensation film 100 and the polarizer 200 may be disposed on the side emitting light. In one embodiment, for example, where the OLED display has bottom emission structure, in which light is emitted at the side of the base substrate 410, the compensation film 100 and the polarizer 200 may be disposed on the exterior side of the base substrate 410. In one alternative embodiment, for example, where the OLED display has a top emission structure, in which light is emitted at the side of the encapsulation substrate 450, the compensation film 100 and the polarizer 200 may be disposed on the exterior side of the encapsulation substrate 450.

The compensation film 100 and the polarizer 200 shown in FIG. 5 are substantially the same as the compensation film 100 and the polarizer 200 of the embodiments shown in FIG. 3 described above, and may function as an anti-reflective film for effectively preventing light passing through the polarizer 200 from being reflected by a metal such as an electrode of the organic light emitting panel 400 and emitted outside of the display device. In such an embodiment, the compensation film 100 may reduce the viewing angle dependency as described above to improve the side viewing angle as well as the front viewing angle. Accordingly, the display characteristics of the OLED display may be improved.

Hereinafter, an embodiment of a display panel, where the display panel is a liquid crystal display ("LCD") will be described with reference to FIG. 6.

Figure 6:
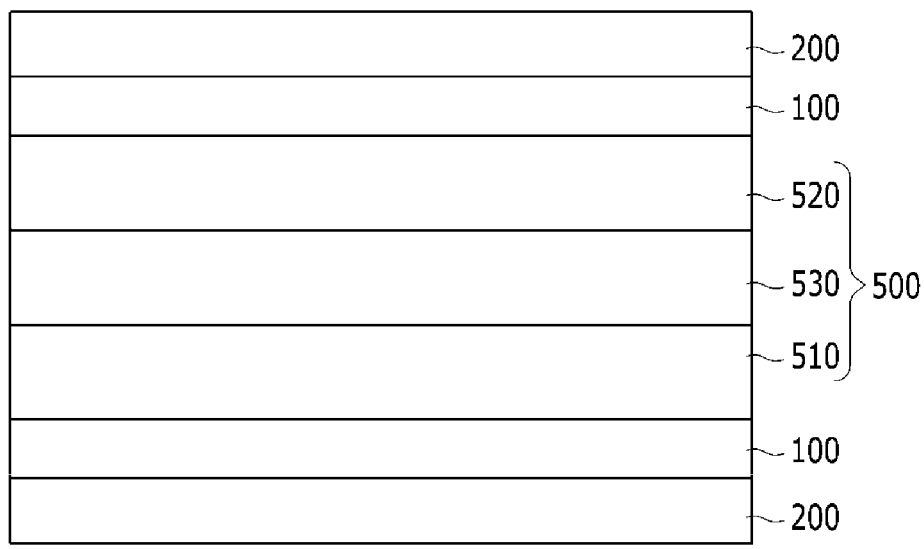
FIG. 6 is a cross-sectional view schematically showing an embodiment of a liquid crystal display ("LCD") device, according to the invention.

FIG. 6 is a cross-sectional view schematically showing an embodiment of an LCD, according to the invention.

Referring to FIG. 6, an embodiment of the LCD includes a liquid crystal display panel 500, a compensation film 100 disposed on a side (e.g., an upper side or a lower side) of the liquid crystal panel 500, and a polarizer element 200 disposed on a side (e.g., an upper side or a lower side) of the compensation film 100.

The liquid crystal panel 500 may be a twist nematic ("TN") mode panel, a vertical alignment ("PVA") mode panel, an in-plane switching ("IPS") mode panel, an optically compensated bend ("OCB") mode panel, or the like.

The liquid crystal panel 500 may include a first display panel 510, a second display panel 520, and a liquid crystal layer 530 interposed between the first display panel 510 and the second display panel 520.

The first display panel 510 may include, for example, a thin film transistor (not shown) disposed on a substrate (not shown) and a first electric field generating electrode (not shown) connected to the thin film transistor, and the second display panel 520 may include, for example, a color filter (not shown) disposed on a substrate (not shown) and a second electric field generating electrode (not shown), but it is not limited thereto. In an alternative embodiment, the color filter may be included in the first display panel 510, while the first electric field generating electrode and the second electric field generating electrode may be disposed on the first display panel 510 together therewith.

In an embodiment, the liquid crystal layer 530 may include a plurality of liquid crystal molecules. The liquid crystal molecules may have positive or negative dielectric anisotropy. In an embodiment, where the liquid crystal molecules have positive dielectric anisotropy, the major axes thereof may be aligned substantially parallel to the surface of the first display panel 510 and the second display panel 520 when an electric field is not applied thereto, and the major axes may be aligned substantially perpendicular to the surface of the first display panel 510 and second display panel 520 when an electric field is applied thereto. In an alternative embodiment, where the liquid crystal molecules have negative dielectric anisotropy, the major axes may be aligned substantially perpendicular to the surface of the first display panel 510 and the second display panel 520 when an electric field is not applied thereto, and the major axes may be aligned substantially parallel to the surface of the first display panel 510 and the second display panel 520 when an electric field is applied thereto.

The compensation film 100 and the polarizer 200 are disposed on the outside of the liquid crystal panel 500. In an embodiment, as shown in FIG. 6, the compensation film 100 and the polarizer 200 may be disposed on both the lower part and the upper part of the liquid crystal panel 500, but they are not limited thereto. In an alternative embodiment, the compensation film 100 and the polarizer 200 may be disposed on only one of the lower part and the upper part of liquid crystal panel 500.

Hereinafter, the disclosure will be illustrated in more detail with reference to examples. However, these examples are exemplary, and the disclosure is not limited thereto.

Manufacture of Compensation Film

Preparation Example 1

(1) Preparation of First Retardation Layer (A)

A poly(styrene-co-methacrylic acid) film (T080, manufactured by TOYO STYRENE) having a thickness of 100 μm is elongated in one axial direction (using a tension tester manufactured by Instron) at about 128° C. at a ratio of 50% to 200% to provide a first retardation layer (A) having optical properties shown in the following Table 1.

(2) Preparation of Second Retardation Layer (B)

A 60 μm-thick Z-TAC film (from Fuji Film) is rubbed in one direction and coated with +A plate liquid crystal (RMS03-013C, Merck & Co., Inc.) in a thickness of about 5 μm to about 10 μm and dried in a drying oven at 60° C. for one minute to remove a coating solvent. Subsequently, ultraviolet ("UV") rays are irradiated thereto at 80 milliwatts per square centimeter (mW/cm$^2$) for 30 seconds in a nitrogen-charged container, so that the liquid crystal molecules are is photo-cross-linked to provide a second retardation layer (B) having the optical properties shown in the following Table 1.

(3) Assembling First Retardation Layer and Second Retardation Layer (AB)

Subsequently, the first retardation layer is disposed to face the liquid crystal layer of the second retardation layer. The first and second retardation layers are disposed to provide an angle between the slow axis of the first retardation layer and the slow axis of the second retardation layer to be about 90 degrees. Subsequently, a liquid crystal layer is transcribed on one side of the first retardation layer, and a Z-TAC film is removed to provide a compensation film (AB) assembled with the first retardation layer and the second retardation layer.

TABLE 1

| | In-plane retardation (Re) | | | Wavelength dispersion | | |
|---|---|---|---|---|---|---|
| | $R_e$ (450 nm) | $R_e$ (550 nm) | $R_e$ (650 nm) | $R_e$ (450 nm)/ $R_e$ (550 nm) | $R_e$ (650 nm)/ $R_e$ (550 nm) | Nz |
| A | 833 | 780 | 751.9 | 1.068 | 0.964 | −0.05 |
| B | 718.7 | 640 | 609.9 | 1.123 | 0.953 | 1.01 |

* Nz = ($R_{th}/R_e$) + 0.5

Preparation Example 2

A compensation film is manufactured in accordance with the same procedure as in Preparation Example 1, except that the first retardation layer (A) and the second retardation layer (B) have the optical properties shown in the following Table 2.

TABLE 2

| | In-plane retardation (Re) | | | Wavelength dispersion | | |
|---|---|---|---|---|---|---|
| | $R_e$ (450 nm) | $R_e$ (550 nm) | $R_e$ (650 nm) | $R_e$ (450 nm)/ $R_e$ (550 nm) | $R_e$ (650 nm)/ $R_e$ (550 nm) | Nz |
| A | 1100 | 1030 | 993 | 1.068 | 0.964 | −0.03 |
| B | 1000 | 890 | 848 | 1.123 | 0.953 | 1.02 |

* Nz = ($R_{th}/R_e$) + 0.5

Preparation Example 3

A compensation film is manufactured in accordance with the same procedure as in Preparation Example 1, except that the first retardation layer (A) and the second retardation layer (B) have the optical properties shown in the following Table 3.

TABLE 3

| | In-plane retardation (Re) | | | Wavelength dispersion | | |
|---|---|---|---|---|---|---|
| | $R_e$ (450 nm) | $R_e$ (550 nm) | $R_e$ (650 nm) | $R_e$ (450 nm)/ $R_e$ (550 nm) | $R_e$ (650 nm)/ $R_e$ (550 nm) | Nz |
| A | 838 | 785 | 757 | 1.068 | 0.964 | −0.04 |
| B | 729 | 640 | 610 | 1.123 | 0.953 | 1.01 |

* Nz = ($R_{th}/R_e$) + 0.5

Preparation Example 4

A compensation film is manufactured in accordance with the same procedure as in Preparation Example 1, except that the first retardation layer (A) and the second retardation layer (B) have the optical properties shown in the following Table 4.

TABLE 4

| | In-plane retardation (Re) | | | Wavelength dispersion | | |
|---|---|---|---|---|---|---|
| | $R_e$ (450 nm) | $R_e$ (550 nm) | $R_e$ (650 nm) | $R_e$ (450 nm)/ $R_e$ (550 nm) | $R_e$ (650 nm)/ $R_e$ (550 nm) | Nz |
| A | 587 | 550 | 530 | 1.068 | 0.964 | −0.04 |
| B | 460 | 410 | 390 | 1.123 | 0.953 | 1.02 |

* Nz = $(R_{th}/R_e)$ + 0.5

Preparation Example 5

A compensation film is manufactured in accordance with the same procedure as in Preparation Example 1, except that the first retardation layer (A) and the second retardation layer (B) have the optical properties shown in the following Table 5.

TABLE 5

| | In-plane retardation (Re) | | | Wavelength dispersion | | |
|---|---|---|---|---|---|---|
| | $R_e$ (450 nm) | $R_e$ (550 nm) | $R_e$ 650 nm | $R_e$ (450 nm)/ $R_e$ (550 nm) | $R_e$ (650 nm)/ $R_e$ (550 nm) | Nz |
| A | 342 | 320 | 309 | 1.068 | 0.964 | −0.04 |
| B | 197 | 175 | 167 | 1.123 | 0.953 | 1.02 |

* Nz = $(R_{th}/R_e)$ + 0.5

Comparative Preparation Example 1

(1) Preparation of First retardation layer (A)

A cycloolefin polymer (manufactured by ZEON) film having a thickness of 100 μm is elongated in one axial direction (using a tension tester manufactured by Instron) at about 140° C. at a ratio of 70% to provide a first retardation layer (A-1) having optical properties shown in the following Table 6.

(2) Preparation of Second retardation layer (B-1)

A Z-TAC film (Fuji Film) having a thickness of 60 μm is rubbed in one direction and coated with +A plate liquid crystal (RMS03-013C, Merck & Co., Inc.) in a thickness of about 10 μm and dried in a drying oven at 60° C. for one minute to remove a coating solvent. Subsequently, UV rays are irradiated thereto at 80 mW/cm² for 30 seconds in a nitrogen-charged container to provide a second retardation layer (B-1) having the optical properties shown in the following Table 6.

(3) Assembling first retardation layer and second retardation layer (A-1/B-1)

Subsequently, the first retardation layer is disposed to face the liquid crystal layer of the second retardation layer. The first and second retardation layers are arranged to provide an angle between the slow axis of the first retardation layer and the slow axis of the second retardation layer to be about 90 degrees. Subsequently, a liquid crystal layer is transcribed on one side of the first retardation layer, and a Z-TAC film is removed to provide a compensation film (A-1/B-1) assembled with the first retardation layer and the second retardation layer.

TABLE 6

| | In-plane retardation (Re) | | | Wavelength dispersion | | |
|---|---|---|---|---|---|---|
| | $R_e$ (450 nm) | $R_e$ (550 nm) | $R_e$ (650 nm) | $R_e$ (450 nm)/ $R_e$ (550 nm) | $R_e$ (650 nm)/ $R_e$ (550 nm) | Nz |
| A-1 | 386 | 383 | 381 | 1.009 | 0.997 | 1.03 |
| B-1 | 279 | 248 | 236 | 1.125 | 0.955 | 1.00 |

* Nz = $(R_{th}/R_e)$ + 0.5

Evaluation 1

The compensation films (AB) according to Preparation Examples 1 to 5 are evaluated for in-plane retardation, thickness direction retardation and wavelength dispersion. The in-plane retardation, the thickness direction retardation and the wavelength dispersion are measured using AxoScan equipment (manufactured by Axometrics). The measured wavelength ranges from about 400 nm to about 700 nm, and the film retardation is measured by adjusting the incident angle in a range from about −70 degrees to about 70 degrees at an interval of 5 degrees.

The results are shown in the following Table 7.

TABLE 7

| | In-plane retardation (Re) | | | wavelength dispersion | | |
|---|---|---|---|---|---|---|
| | $R_e$ (450 nm) | $R_e$ (550 nm) | $R_e$ (650 nm) | $R_e$(450 nm)/ $R_e$(550 nm) | $R_e$(650 nm)/ $R_e$(550 nm) | Nz |
| Preparation Example 1 (AB) | 114 | 140 | 147 | 0.81 | 1.05 | −0.25 |
| Preparation Example 2 (AB) | 101 | 140 | 145 | 0.72 | 1.03 | −0.18 |
| Preparation Example 3 (AB) | 120 | 145 | 147 | 0.83 | 1.02 | −0.16 |
| Preparation Example 4 (AB) | 127 | 140 | 141 | 0.90 | 1.00 | −0.12 |
| Preparation Example 5 (AB) | 136 | 143 | 144 | 0.95 | 1.00 | −0.10 |

* Nz = [($R_{th}$ of the first retardation layer (A) + $R_{th}$ of the second retardation layer (B))/($R_e$ of the first retardation layer A − $R_e$ of the second retardation layer(B))] + 0.5

Referring to Table 7, an exemplary embodiment of the compensation films, e.g., Preparation Examples 1 to 5, may have the reverse wavelength dispersion retardation, and the viewing angle dependency may be improved by satisfying the range of −1.0≤Nz≤1.0 and sufficiently offsetting the thickness direction retardation.

Manufacture of OLED Display

Example 1

An organic light emitting display panel having a structure sequentially stacked on a glass substrate with a cathode including a metallic electrode material, an organic emission layer including a light emitting material, an anode including a transparent conductivity material, and an upper substrate. The compensation film according to Preparation Example 1 and a polarizer (manufactured by Cheil Industries Inc.) are sequentially attached to the upper substrate of the organic light emitting display panel to provide an OLED display.

Comparative Example 1

An OLED display is manufactured in accordance with the same procedure as in Example 1, except using the compensation film according to Comparative Preparation Example 1 instead of the compensation film according to Preparation Example 1.

Evaluation 2

The OLED displays according to Example 1 and Comparative Example 1 are evaluated for a reflectance and a color shift at the front. The color shift uses a horizontal axis of a* value and a vertical axis of b* value, where a positive a* value means red, a negative a* value means green, a positive b* value means yellow, a negative b* value means blue, and as absolute values of a* and b* are higher, the color is darker. The smaller a*, b* and Δa* b* values are, the better the color shift is.

The reflectance and the color shift at the front side are evaluated by supplying light under the conditions of a D65 light source, reflection of 8 degrees, and a light receiving part of 2 degrees, and using a spectrum colorimeter (CM-3600d, manufactured by Konica Minolta).

The results are shown in the following Table 8.

TABLE 8

| | Front reflectance (%) | a* | b* | Δa*b* |
|---|---|---|---|---|
| Example 1 | 5.20 | 0.21 | −0.64 | 0.67 |
| Comparative Example 1 | 5.17 | 1.17 | −2.18 | 2.47 |

*Δa*b* = $\sqrt{a^{*2}+b^{*2}}$

Referring to Table 8, the OLED display according to Example 1 has similar front reflectance and significantly improved color shift compared to the OLED display according to Comparative Example 1. Specifically, the OLED display according to Example 1 has similar front reflectance and improved the color shift by 1.80 compared to the OLED display according to Comparative Example 1.

Evaluation 3

The OLED displays according to Example 1 and Comparative Example 1 are evaluated for reflectance and color shift at the side. The reflectance and the color shift at the side are evaluated by EZContrast equipment (manufactured by ELDIM).

The results are shown in the following Table 9.

TABLE 9

| | 45° side reflectance (%) | 65° side reflectance (%) | 45° color shift |
|---|---|---|---|
| Example 1 | 8.28 | 13.49 | 5.43 |
| Comparative Example 1 | 11.97 | 21.99 | 9.59 |

Referring to Table 9, the OLED display according to Example 1 significantly improves the side reflectance and color shift compared to the OLED display according to Comparative Example 1. Accordingly, an exemplary embodiment of the OLED display, e.g., the OLED display according to Example 1, may significantly reduce the viewing angle dependency.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A compensation film comprising:
a first retardation layer comprising a polymer having negative birefringence, the first retardation layer being a polymer layer elongated in one axial direction; and
a second retardation layer comprising an +A plate liquid crystal having positive birefringence, the second retardation layer being an anisotropic liquid crystal layer,
wherein
the first retardation layer has an in-plane retardation ($R_{e1}$) in a range of 320 nm to 1050 nm for incident light having a wavelength of 550 nm,
the second retardation layer has an in-plane retardation ($R_{e2}$) in a range of 180 nm to 910 nm for the incident light having the wavelength of 550 nm,
an entire in-plane retardation ($R_{e0}$) of the first retardation layer and the second retardation layer for the incident light having the wavelength of 550 nm is a difference between the in-plane retardation ($R_{e1}$) of the first retardation layer and the in-plane retardation ($R_{e2}$) of the second retardation layer,
an angle between a slow axis of the first retardation layer and a slow axis of the second retardation layer is in a range of 85 degrees to 95 degrees,
the entire in-plane retardation ($R_{e0}$) of the first retardation layer and the second retardation layer for the wavelength of 450 nm, 550 nm and 650 nm satisfies the following inequation: $R_{e0}$ (450 nm)<$R_{e0}$ (550 nm)<$R_{e0}$ (650 nm),
a thickness direction retardation ($R_{th0}$) and the in-plane retardation ($R_{e0}$) of the compensation film for the incident light having the wavelength of 550 nm satisfy the following inequation: $-1.0 \leq (R_{th0}/R_{e0})+0.5 \leq 0$,
a thickness direction retardation (Rth1) and the in-plane retardation (Re1) of the first retardation layer for the incident light having the wavelength of 550 nm satisfy the following Inequation: $-2.0 \leq (Rth1/Re1)+0.5 \leq 0.5$; and
a thickness direction retardation (Rth2) and the in-plane retardation (Re2) of the second retardation layer for the incident light having the wavelength of 550 nm satisfy the following Inequation: $1.0 \leq (Rth2/Re2)+0.5 \leq 1.5$.

2. The compensation film of claim 1, wherein the entire in-plane retardation ($R_{e0}$) of the first retardation layer and the second retardation layer for the incident light having the wavelength of 550 nm is in a range of 120 nm to 160 nm.

3. The compensation film of claim 1, wherein
the first retardation layer has a short wavelength dispersion in a range of 1.00 to 1.15, the short wavelength dispersion of the first retardation layer being represented by $R_{e1}$ (450 nm)/$R_{e1}$ (550 nm), and
the second retardation layer has a short wavelength dispersion in a range of 1.05 to 1.30, the short wavelength dispersion of the second retardation layer being represented by $R_{e2}$ (450 nm)/$R_{e2}$ (550 nm).

4. The compensation film of claim 1, wherein
the first retardation layer has a long wavelength dispersion in a range of 0.90 to 1.00, the long wavelength dispersion of the first retardation layer being represented by $R_{e1}$ (650 nm)/$R_{e1}$ (550 nm), and the second retardation layer has a long wavelength dispersion in a range of 0.80 to 0.99, the long wavelength dispersion of the second retardation layer being represented by $R_{e2}$ (650 nm)/$R_{e2}$ (550 nm).

5. The compensation film of claim 1, wherein
the compensation film has a short wavelength dispersion greater than or equal to 0.7 and less than 1.0, the short wavelength dispersion of the compensation film being represented by $R_{e0}$ (450 nm)/$R_{e0}$ (550 nm), and
the compensation film has a long wavelength dispersion greater than 1.0 and less than or equal to 1.2, the long wavelength dispersion of the compensation film being represented by $R_{e0}$ (650 nm)/$R_{e0}$ (550 nm).

6. The compensation film of claim 1, wherein the polymer comprises polystyrene, poly(styrene-co-maleic anhydride), polymaleimide, poly(meth)acrylic acid, polyacrylonitrile, polymethyl(meth)acrylate, cellulose ester, poly(styrene-co-acrylonitrile), poly(styrene-co-maleimide), poly(styrene-co-methacrylic acid), a derivative thereof, a copolymer thereof, or a mixture thereof.

7. The compensation film of claim 1, wherein the liquid crystal is a reactive mesogen liquid crystal.

8. The compensation film of claim 7, wherein the reactive mesogen liquid crystal comprises a rod-shaped aromatic derivative having a reactive cross-linking group, propylene glycol 1-methyl, propylene glycol 2-acetate, a compound represented by P1-A1-(Z1-A2)n-P2, or a combination thereof,
wherein
P1 and P2 each independently comprises acrylate, methacrylate, vinyl, vinyloxy, epoxy, or a combination thereof,
A1 and A2 each independently comprises 1,4-phenylene, naphthalene-2,6-diyl group, or a combination thereof,
Z1 comprises a single bond, —COO—, —OCO—, or a combination thereof, and
n is 0, 1 or 2.

9. An optical film comprising:
a polarizer element; and
the compensation film of claim 1.

10. A display device comprising:
a display panel;
a compensation film disposed on the display panel; and
a polarizer element disposed on the compensation film,
wherein the compensation film comprises:
a first retardation layer comprising a polymer having negative birefringence, the first retardation layer being a polymer layer elongated in one axial direction; and
a second retardation layer comprising an +A liquid liquid crystal having positive birefringence, the second retardation layer being an anisotropic liquid crystal layer,
wherein
the first retardation layer has an in-plane retardation ($R_{e1}$) in a range of 320 nm to 1050 nm for incident light having a wavelength of 550 nm,
the second retardation layer has an in-plane retardation ($R_{e2}$) in a range of 180 nm to 910 nm for the incident light having the wavelength of 550 nm,
an entire in-plane retardation ($R_{e0}$) of the first retardation layer and the second retardation layer for the incident light having the wavelength of 550 nm is a difference between the in-plane retardation ($R_{e1}$) of the first retardation layer and the in-plane retardation ($R_{e2}$) of the second retardation layer, the entire in-plane retardation ($R_{e0}$) of the first retardation layer and the second retardation layer for the wavelength of 450 nm, 550 nm, and 650 nm satisfies $R_{e0}$ (450 nm)<$R_{e0}$ (550 nm)<$R_{e0}$ (650 nm),
an angle between a slow axis of the first retardation layer and a slow axis of the second retardation layer is in a range of 85 degrees to 95 degrees,
a thickness direction retardation ($R_{th0}$) and the in-plane retardation ($R_{e0}$) of the compensation film for the incident light having the wavelength of 550 nm satisfy the following inequation: $-1.0 \leq (R_{th0}/R_{e0})+0.23<0$,
a thickness direction retardation (Rth1) and the in-plane retardation (Re1) of the first retardation layer for the incident light having a wavelength of 550 nm satisfy the following Inequation: $-2.0 \leq (Rth1/Re1)+0.5 \leq 0.5$, and
a thickness direction retardation (Rth2) and the in-plane retardation (Re2) of the second retardation layer for the incident light having the wavelength of 550 nm safety the following Inequation: $1.0 \leq (Rth2/Re2)+0.5 \leq 1.5$.

11. The display device of claim 10, wherein
the first retardation layer has a short wavelength dispersion in a range of 1.00 to 1.15, the short wavelength dispersion of the first retardation layer being represented by $R_{e1}$ (450 nm)/$R_{e1}$ (550 nm),
the second retardation layer has a short wavelength dispersion in a range of 1.05 to 1.30, the short wavelength dispersion of the second retardation layer being represented by $R_{e2}$ (450 nm)/$R_{e2}$ (550 nm),
the first retardation layer has a long wavelength dispersion in a range of 0.90 to 1.00, the long wavelength dispersion of the first retardation layer being represented by $R_{e1}$ (650 nm)/$R_{e1}$ (550 nm),
the second retardation layer has a long wavelength dispersion in a range of 0.80 to 0.99, the long wavelength dispersion of the second retardation layer being represented by $R_{e2}$ (650 nm)/$R_{e2}$ (550 nm),
an entire short wavelength dispersion of the first retardation layer and the second retardation layer is greater than or equal to 0.7 and less than 1.0, the entire short wavelength dispersion of the first retardation layer and the second retardation layer being represented by $R_{e0}$ (450 nm)/$R_{e0}$ (550 nm), and
an entire long wavelength dispersion of the first retardation layer and the second retardation layer is greater than 1.0 and less than or equal to 1.2, the entire long wavelength dispersion of the first retardation layer and the second retardation layer being represented by $R_{e0}$ (650 nm)/$R_{e0}$ (550 nm).

12. The display device of claim 10, wherein
the first retardation layer is an elongated polymer layer comprising polystyrene, poly(styrene-co-maleic anhydride), polymaleimide, poly(meth)acrylic acid, polyacrylonitrile, polymethyl(meth)acrylate, cellulose ester, poly(styrene-co-acrylonitrile), poly(styrene-co-maleimide), poly(styrene-co-methacrylic acid), a derivative thereof, a copolymer thereof, or a mixture thereof, and
the second retardation layer is an anisotropic liquid crystal layer comprising a reactive mesogen liquid crystal.

13. The display device of claim 10, wherein the display panel is a liquid crystal display panel or an organic light emitting display panel.

* * * * *